(12) United States Patent  
Bushey

(10) Patent No.: US 9,088,657 B2
(45) Date of Patent: *Jul. 21, 2015

(54) SYSTEM AND METHOD OF AUTOMATED ORDER STATUS RETRIEVAL

(71) Applicant: AT&T INTELLECTUAL PROPERTY I, L.P., Atlanta, GA (US)

(72) Inventor: Robert Bushey, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,467

(22) Filed: Mar. 12, 2014

(65) Prior Publication Data

US 2014/0192972 A1 Jul. 10, 2014

Related U.S. Application Data

(63) Continuation of application No. 13/862,950, filed on Apr. 15, 2013, now Pat. No. 8,731,165, and a continuation of application No. 11/173,227, filed on Jul. 1, 2005, now Pat. No. 8,503,641.

(51) Int. Cl.
*H04M 3/42* (2006.01)
*H04M 3/00* (2006.01)
(Continued)

(52) U.S. Cl.
CPC .............. *H04M 3/523* (2013.01); *H04M 3/51* (2013.01); *H04M 3/5166* (2013.01); *H04M 2203/2011* (2013.01)

(58) Field of Classification Search
CPC ........ G06Q 10/06; H04M 3/323; H04M 3/36; H04M 3/4285; H04M 3/493; H04M 3/51; H04M 3/5166; H04M 3/5175; H04M 3/5183; H04M 3/523; H04M 3/5232; H04M 3/5233; H04M 3/5237; H04M 3/5238; H04M 2203/2061; H04M 2242/12
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS 4,953,204 A 8/1990 Cuschleg, Jr. et al.
4,967,405 A 10/1990 Upp et al.
(Continued)

FOREIGN PATENT DOCUMENTS

EP 0424015 A2 4/1991
EP 0424015 A3 4/1991
(Continued)

OTHER PUBLICATIONS

Ogino, T. et al., "Study of an Efficient Server Selection Method for Widely Distributed Web Server Networks," iNet 2000 Proceedings, www.isoc.org/inet2000/cdproceedings/1g/index.htm, Jun. 30, 2000, INet Japan Computer Society, 19 pages.

*Primary Examiner* — Khai N Nguyen
(74) *Attorney, Agent, or Firm* — Toler Law Group, PC

(57) ABSTRACT

A computer-readable storage device stores instructions that, when executed by a processor, cause the processor to perform operations including selectively transferring a call to equipment of a customer service agent based on an order status. The call is automatically transferred to the equipment of the customer service agent in response to receiving an indication that the order status is not locatable.

20 Claims, 2 Drawing Sheets

(51) Int. Cl.
  *H04M 5/00* (2006.01)
  *H04M 11/00* (2006.01)
  *H04M 3/523* (2006.01)
  *H04M 3/51* (2006.01)

(56) References Cited

U.S. PATENT DOCUMENTS

| | | | |
|---|---|---|---|
| 4,975,841 | A | 12/1990 | Kehnemuyi et al. |
| 5,335,269 | A | 8/1994 | Steinlicht |
| 5,455,903 | A | 10/1995 | Jolissaint et al. |
| 5,497,373 | A | 3/1996 | Hulen et al. |
| 5,522,046 | A | 5/1996 | McMillen et al. |
| 5,530,744 | A | 6/1996 | Charalambous et al. |
| 5,530,848 | A | 6/1996 | Gilbert et al. |
| 5,555,299 | A | 9/1996 | Maloney et al. |
| 5,590,186 | A | 12/1996 | Liao et al. |
| 5,652,789 | A | 7/1997 | Miner et al. |
| 5,754,639 | A | 5/1998 | Flockhart et al. |
| 5,754,978 | A | 5/1998 | Perez-Mendez et al. |
| 5,867,562 | A | 2/1999 | Scherer |
| 5,867,817 | A | 2/1999 | Catallo et al. |
| 5,923,745 | A | 7/1999 | Hurd |
| 5,937,051 | A | 8/1999 | Hurd et al. |
| 5,940,476 | A | 8/1999 | Morganstein et al. |
| 5,946,388 | A | 8/1999 | Walker et al. |
| 5,953,704 | A | 9/1999 | McIlroy et al. |
| 5,999,965 | A | 12/1999 | Kelly |
| 6,002,689 | A | 12/1999 | Christie et al. |
| 6,002,760 | A | 12/1999 | Gisby |
| 6,003,011 | A | 12/1999 | Sarin et al. |
| 6,049,594 | A | 4/2000 | Furman et al. |
| 6,067,357 | A * | 5/2000 | Kishinsky et al. ....... 379/265.02 |
| 6,104,798 | A | 8/2000 | Lickiss et al. |
| 6,118,866 | A | 9/2000 | Shtivelman |
| 6,119,101 | A | 9/2000 | Peckover |
| 6,173,266 | B1 | 1/2001 | Marx et al. |
| 6,173,289 | B1 | 1/2001 | Sonderegger et al. |
| 6,173,399 | B1 | 1/2001 | Gilbrech |
| 6,175,621 | B1 | 1/2001 | Begeja |
| 6,178,239 | B1 * | 1/2001 | Kishinsky et al. ....... 379/266.07 |
| 6,259,786 | B1 | 7/2001 | Gisby |
| 6,269,153 | B1 | 7/2001 | Carpenter et al. |
| 6,317,439 | B1 | 11/2001 | Cardona et al. |
| 6,333,980 | B1 | 12/2001 | Hollatz et al. |
| 6,353,608 | B1 | 3/2002 | Cullers et al. |
| 6,366,658 | B1 | 4/2002 | Bjornberg et al. |
| 6,366,668 | B1 | 4/2002 | Borst et al. |
| 6,370,231 | B1 * | 4/2002 | Hice ....................... 379/32.01 |
| 6,381,329 | B1 | 4/2002 | Uppaluru et al. |
| 6,385,584 | B1 | 5/2002 | McAllister et al. |
| 6,389,400 | B1 | 5/2002 | Bushey et al. |
| 6,400,804 | B1 | 6/2002 | Bilder |
| 6,400,996 | B1 | 6/2002 | Hoffberg et al. |
| 6,405,159 | B2 | 6/2002 | Bushey et al. |
| 6,414,966 | B1 | 7/2002 | Kulkarni et al. |
| 6,418,424 | B1 | 7/2002 | Hoffberg et al. |
| 6,442,247 | B1 | 8/2002 | Garcia |
| 6,510,414 | B1 | 1/2003 | Chaves |
| 6,519,562 | B1 | 2/2003 | Phillips et al. |
| 6,529,871 | B1 | 3/2003 | Kanevsky et al. |
| 6,546,095 | B1 * | 4/2003 | Iverson et al. ........... 379/201.12 |
| 6,553,113 | B1 | 4/2003 | Dhir et al. |
| 6,570,967 | B2 | 5/2003 | Katz |
| 6,584,180 | B2 | 6/2003 | Nemoto |
| 6,587,556 | B1 | 7/2003 | Judkins et al. |
| 6,598,136 | B1 | 7/2003 | Norrod et al. |
| 6,600,736 | B1 | 7/2003 | Ball et al. |
| 6,603,854 | B1 | 8/2003 | Judkins et al. |
| 6,614,781 | B1 | 9/2003 | Elliott et al. |
| 6,631,186 | B1 | 10/2003 | Gibson et al. |
| 6,678,360 | B1 | 1/2004 | Katz |
| 6,678,718 | B1 | 1/2004 | Khouri et al. |
| 6,690,788 | B1 | 2/2004 | Bauer et al. |
| 6,694,012 | B1 | 2/2004 | Posthuma |
| 6,697,460 | B2 | 2/2004 | Knott et al. |
| 6,700,972 | B1 | 3/2004 | McHugh et al. |
| 6,704,404 | B1 | 3/2004 | Burnett |
| 6,707,789 | B1 | 3/2004 | Arslan et al. |
| 6,714,631 | B1 | 3/2004 | Martin et al. |
| 6,721,416 | B1 | 4/2004 | Farrell |
| 6,731,722 | B2 | 5/2004 | Coffey |
| 6,738,473 | B1 | 5/2004 | Burg et al. |
| 6,744,861 | B1 | 6/2004 | Pershan et al. |
| 6,744,877 | B1 | 6/2004 | Edwards |
| 6,751,306 | B2 | 6/2004 | Himmel et al. |
| 6,757,306 | B1 | 6/2004 | Klish, II et al. |
| 6,760,727 | B1 * | 7/2004 | Schroeder et al. ..................... 1/1 |
| 6,766,320 | B1 | 7/2004 | Wang et al. |
| 6,775,359 | B1 | 8/2004 | Ron et al. |
| 6,778,643 | B1 | 8/2004 | Bushey et al. |
| 6,792,096 | B2 | 9/2004 | Martin et al. |
| 6,807,274 | B2 | 10/2004 | Joseph et al. |
| 6,823,307 | B1 | 11/2004 | Steinbiss et al. |
| 6,829,348 | B1 * | 12/2004 | Schroeder et al. ........ 379/265.09 |
| 6,831,932 | B1 | 12/2004 | Boyle et al. |
| 6,832,224 | B2 | 12/2004 | Gilmour |
| 6,839,701 | B1 * | 1/2005 | Baer et al. ............................. 1/1 |
| 6,842,504 | B2 | 1/2005 | Mills et al. |
| 6,847,711 | B2 | 1/2005 | Knott et al. |
| 6,853,722 | B2 | 2/2005 | Joseph et al. |
| 6,853,966 | B2 | 2/2005 | Bushey et al. |
| 6,859,529 | B2 | 2/2005 | Duncan et al. |
| 6,871,212 | B2 | 3/2005 | Khouri et al. |
| 6,879,683 | B1 | 4/2005 | Fain et al. |
| 6,885,734 | B1 | 4/2005 | Eberle et al. |
| 6,891,932 | B2 | 5/2005 | Bhargava et al. |
| 6,895,083 | B1 | 5/2005 | Bers et al. |
| 6,901,366 | B1 | 5/2005 | Kuhn et al. |
| 6,907,119 | B2 | 6/2005 | Case et al. |
| 6,915,246 | B2 | 7/2005 | Gusler et al. |
| 6,963,983 | B2 | 11/2005 | Munson et al. |
| 7,006,605 | B1 | 2/2006 | Morganstein et al. |
| 7,242,751 | B2 | 7/2007 | Bushey et al. |
| 7,257,547 | B1 * | 8/2007 | Terase ................................. 705/15 |
| 7,325,009 | B1 * | 1/2008 | Cleary et al. ......................... 1/1 |
| 7,366,772 | B2 * | 4/2008 | Arroyo et al. ................. 709/223 |
| 7,450,698 | B2 | 11/2008 | Bushey et al. |
| 7,580,837 | B2 | 8/2009 | Bushey et al. |
| 7,602,898 | B2 | 10/2009 | Klein et al. |
| 7,627,096 | B2 | 12/2009 | Bushey et al. |
| 7,636,432 | B2 | 12/2009 | Bushey et al. |
| 7,657,005 | B2 | 2/2010 | Chang |
| 7,657,436 | B2 * | 2/2010 | Elmore et al. ................. 705/1.1 |
| 7,668,889 | B2 | 2/2010 | Edwards et al. |
| 7,672,859 | B1 * | 3/2010 | Louie et al. ....................... 705/3 |
| 7,684,989 | B1 | 3/2010 | Collins et al. |
| 7,724,889 | B2 | 5/2010 | Bushey et al. |
| 7,751,551 | B2 | 7/2010 | Bushey et al. |
| 7,864,942 | B2 | 1/2011 | Knott et al. |
| 7,933,399 | B2 | 4/2011 | Knott et al. |
| 7,936,861 | B2 | 5/2011 | Knott et al. |
| 8,005,204 | B2 | 8/2011 | Bushey et al. |
| 8,130,936 | B2 | 3/2012 | Kortum et al. |
| 8,165,281 | B2 | 4/2012 | Joseph et al. |
| 8,175,253 | B2 | 5/2012 | Knott et al. |
| 8,223,954 | B2 | 7/2012 | Dallessandro et al. |
| 8,589,777 | B1 * | 11/2013 | Baer et al. ....................... 715/200 |
| 2001/0011211 | A1 | 8/2001 | Bushey et al. |
| 2001/0018672 | A1 | 8/2001 | Petters et al. |
| 2001/0021948 | A1 | 9/2001 | Khouri et al. |
| 2001/0029184 | A1 * | 10/2001 | I'Anson et al. ................. 455/456 |
| 2001/0032229 | A1 | 10/2001 | Hulls et al. |
| 2001/0034662 | A1 | 10/2001 | Morris |
| 2002/0016757 | A1 | 2/2002 | Johnson et al. |
| 2002/0019768 | A1 * | 2/2002 | Fredrickson et al. ........... 705/14 |
| 2002/0026394 | A1 * | 2/2002 | Savage et al. ................... 705/34 |
| 2002/0046030 | A1 | 4/2002 | Haritsa et al. |
| 2002/0046130 | A1 * | 4/2002 | Monteleone et al. ........... 705/26 |
| 2002/0056000 | A1 | 5/2002 | Albert Coussement |
| 2002/0057678 | A1 | 5/2002 | Jiang et al. |
| 2002/0059164 | A1 | 5/2002 | Shtivelman |
| 2002/0059169 | A1 | 5/2002 | Quarterman et al. |
| 2002/0067714 | A1 | 6/2002 | Crain et al. |
| 2002/0077876 | A1 * | 6/2002 | O'Meara et al. ................... 705/8 |

(56) References Cited

U.S. PATENT DOCUMENTS

| | | | | |
|---|---|---|---|---|
| 2002/0087385 | A1 | 7/2002 | Vincent | |
| 2002/0087558 | A1 | 7/2002 | Bailey et al. | |
| 2002/0091617 | A1 | 7/2002 | Keith | |
| 2002/0095357 | A1* | 7/2002 | Hunter et al. | 705/27 |
| 2002/0107763 | A1* | 8/2002 | Palmer et al. | 705/29 |
| 2002/0114432 | A1 | 8/2002 | Shaffer et al. | |
| 2002/0133394 | A1 | 9/2002 | Bushey et al. | |
| 2002/0133413 | A1 | 9/2002 | Chang et al. | |
| 2002/0135618 | A1 | 9/2002 | Maes et al. | |
| 2002/0143655 | A1* | 10/2002 | Elston et al. | 705/26 |
| 2002/0156699 | A1 | 10/2002 | Gray et al. | |
| 2002/0156722 | A1* | 10/2002 | Greenwood | 705/37 |
| 2002/0165732 | A1 | 11/2002 | Ezzeddine et al. | |
| 2002/0196277 | A1 | 12/2002 | Bushey et al. | |
| 2003/0014335 | A1 | 1/2003 | Lecheler-Moore et al. | |
| 2003/0026409 | A1 | 2/2003 | Bushey et al. | |
| 2003/0035381 | A1 | 2/2003 | Chen et al. | |
| 2003/0035516 | A1 | 2/2003 | Guedalia | |
| 2003/0055520 | A1* | 3/2003 | Tomii | 700/97 |
| 2003/0065574 | A1* | 4/2003 | Lawrence | 705/26 |
| 2003/0069937 | A1 | 4/2003 | Khouri et al. | |
| 2003/0097428 | A1 | 5/2003 | Afkhami et al. | |
| 2003/0103619 | A1 | 6/2003 | Brown et al. | |
| 2003/0105542 | A1* | 6/2003 | Arnold et al. | 700/102 |
| 2003/0114105 | A1 | 6/2003 | Haller et al. | |
| 2003/0118159 | A1 | 6/2003 | Shen et al. | |
| 2003/0130864 | A1 | 7/2003 | Ho et al. | |
| 2003/0143981 | A1 | 7/2003 | Kortum et al. | |
| 2003/0144846 | A1 | 7/2003 | Denenberg et al. | |
| 2003/0144919 | A1 | 7/2003 | Trompette et al. | |
| 2003/0149644 | A1* | 8/2003 | Stingel et al. | 705/28 |
| 2003/0149653 | A1 | 8/2003 | Penney et al. | |
| 2003/0156133 | A1 | 8/2003 | Martin et al. | |
| 2003/0158791 | A1* | 8/2003 | Gilberto et al. | 705/27 |
| 2003/0165223 | A1 | 9/2003 | Timmins et al. | |
| 2003/0187732 | A1 | 10/2003 | Seta | |
| 2003/0187773 | A1 | 10/2003 | Santos et al. | |
| 2003/0187865 | A1 | 10/2003 | Frisina | |
| 2003/0194063 | A1 | 10/2003 | Martin et al. | |
| 2003/0195753 | A1 | 10/2003 | Homuth | |
| 2003/0202640 | A1 | 10/2003 | Knott et al. | |
| 2003/0202643 | A1 | 10/2003 | Joseph et al. | |
| 2003/0202649 | A1 | 10/2003 | Haug, Jr. et al. | |
| 2003/0204435 | A1 | 10/2003 | McQuilkin et al. | |
| 2003/0228007 | A1 | 12/2003 | Kurosaki | |
| 2003/0235287 | A1 | 12/2003 | Margolis | |
| 2004/0005047 | A1 | 1/2004 | Joseph et al. | |
| 2004/0006473 | A1 | 1/2004 | Mills et al. | |
| 2004/0032862 | A1 | 2/2004 | Schoeneberger et al. | |
| 2004/0032935 | A1 | 2/2004 | Mills et al. | |
| 2004/0034564 | A1* | 2/2004 | Liu | 705/15 |
| 2004/0042592 | A1 | 3/2004 | Knott et al. | |
| 2004/0044950 | A1 | 3/2004 | Mills et al. | |
| 2004/0066401 | A1 | 4/2004 | Bushey et al. | |
| 2004/0066416 | A1 | 4/2004 | Knott et al. | |
| 2004/0073569 | A1 | 4/2004 | Knott et al. | |
| 2004/0083479 | A1 | 4/2004 | Bondarenko et al. | |
| 2004/0088285 | A1 | 5/2004 | Martin et al. | |
| 2004/0103017 | A1 | 5/2004 | Reed et al. | |
| 2004/0109555 | A1 | 6/2004 | Williams | |
| 2004/0120473 | A1 | 6/2004 | Birch et al. | |
| 2004/0125937 | A1 | 7/2004 | Turcan et al. | |
| 2004/0125938 | A1 | 7/2004 | Turcan et al. | |
| 2004/0125940 | A1 | 7/2004 | Turcan et al. | |
| 2004/0161078 | A1 | 8/2004 | Knott et al. | |
| 2004/0161094 | A1 | 8/2004 | Martin et al. | |
| 2004/0161096 | A1 | 8/2004 | Knott et al. | |
| 2004/0174980 | A1 | 9/2004 | Knott et al. | |
| 2004/0186765 | A1* | 9/2004 | Kataoka | 705/10 |
| 2004/0210467 | A1* | 10/2004 | Yokoyama | 705/8 |
| 2004/0230438 | A1 | 11/2004 | Pasquale et al. | |
| 2004/0240635 | A1 | 12/2004 | Bushey et al. | |
| 2004/0243568 | A1 | 12/2004 | Wang et al. | |
| 2005/0008141 | A1 | 1/2005 | Kortum et al. | |
| 2005/0015256 | A1 | 1/2005 | Kargman | |
| 2005/0015265 | A1* | 1/2005 | Price | 705/1 |
| 2005/0015744 | A1 | 1/2005 | Bushey et al. | |
| 2005/0021567 | A1 | 1/2005 | Holenstein et al. | |
| 2005/0027535 | A1 | 2/2005 | Martin et al. | |
| 2005/0041796 | A1 | 2/2005 | Joseph et al. | |
| 2005/0047578 | A1 | 3/2005 | Knott et al. | |
| 2005/0049940 | A1 | 3/2005 | Tengler et al. | |
| 2005/0055216 | A1 | 3/2005 | Bushey et al. | |
| 2005/0055599 | A1 | 3/2005 | Bravo et al. | |
| 2005/0058264 | A1 | 3/2005 | Joseph et al. | |
| 2005/0060200 | A1* | 3/2005 | Kobylevsky et al. | 705/2 |
| 2005/0075894 | A1 | 4/2005 | Bushey et al. | |
| 2005/0078805 | A1 | 4/2005 | Mills et al. | |
| 2005/0080630 | A1 | 4/2005 | Mills et al. | |
| 2005/0080667 | A1 | 4/2005 | Knott et al. | |
| 2005/0088684 | A1* | 4/2005 | Naito et al. | 358/1.15 |
| 2005/0097034 | A1 | 5/2005 | Loeger et al. | |
| 2005/0131892 | A1 | 6/2005 | Knott et al. | |
| 2005/0132262 | A1 | 6/2005 | Bushey et al. | |
| 2005/0135595 | A1 | 6/2005 | Bushey et al. | |
| 2005/0141692 | A1 | 6/2005 | Scherer et al. | |
| 2005/0141694 | A1 | 6/2005 | Wengrovitz | |
| 2005/0169441 | A1 | 8/2005 | Yacoub et al. | |
| 2005/0169449 | A1 | 8/2005 | Coughlin, Jr. et al. | |
| 2005/0169453 | A1 | 8/2005 | Knott et al. | |
| 2005/0201547 | A1 | 9/2005 | Burg et al. | |
| 2005/0240411 | A1 | 10/2005 | Yacoub | |
| 2005/0289015 | A1* | 12/2005 | Hunter et al. | 705/27 |
| 2006/0026049 | A1 | 2/2006 | Joseph et al. | |
| 2006/0050865 | A1 | 3/2006 | Kortum et al. | |
| 2006/0059107 | A1* | 3/2006 | Elmore et al. | 705/64 |
| 2006/0062375 | A1 | 3/2006 | Pasquale et al. | |
| 2006/0109974 | A1 | 5/2006 | Paden et al. | |
| 2006/0126808 | A1 | 6/2006 | Dallessandro et al. | |
| 2006/0126811 | A1 | 6/2006 | Bushey et al. | |
| 2006/0188087 | A1 | 8/2006 | Kortum et al. | |
| 2007/0047718 | A1 | 3/2007 | Idler et al. | |
| 2007/0192362 | A1 | 8/2007 | Caballero et al. | |
| 2013/0230162 | A1 | 9/2013 | Bushey | |

FOREIGN PATENT DOCUMENTS

| | | | |
|---|---|---|---|
| EP | 0424015 | B1 | 4/1991 |
| WO | 9726612 | A1 | 7/1997 |
| WO | 0137539 | A2 | 5/2001 |
| WO | 0137539 | A3 | 5/2001 |
| WO | 2004017584 | A1 | 2/2004 |
| WO | 2004049222 | A2 | 6/2004 |

* cited by examiner

SYSTEM AND METHOD OF AUTOMATED ORDER STATUS RETRIEVAL

CLAIM OF PRIORITY

This application claims priority from, and is a continuation of, U.S. patent application Ser. No. 13/862,950, filed on Apr. 15, 2013, issued as U.S. Pat. No. 8,731,165, and entitled "SYSTEM AND METHOD OF AUTOMATED ORDER STATUS RETRIEVAL", which is a continuation of U.S. patent application Ser. No. 11/173,227, filed on Jul. 1, 2005, issued as U.S. Pat. No. 8,503,641, and entitled "SYSTEM AND METHOD OF AUTOMATED ORDER STATUS RETRIEVAL", the contents of each of which is hereby incorporated in its entirety.

FIELD OF THE DISCLOSURE

The present disclosure relates generally to call centers.

BACKGROUND

Many goods and services are purchased via telephone. For example, a customer wishing to purchase direct subscriber line (DSL) service from a telecommunication company can call a customer service agent at a call center associated with the telecommunication company and order DSL service for a business or residence. While the order is pending, the customer may want to know the order status of the order. As such, the customer has to, again, call a customer service agent in order to determine the order status of the order. Employing customer service agents to handle order status calls can be quite expensive.

Accordingly, there is a need for an improved system and method of providing order status via a telephone.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

A method of managing telephone calls is disclosed and includes receiving a telephone call from a caller, prompting the caller to provide a reason for the telephone call, and transferring the telephone call to an automated enterprise check order status system when check order status is indicated as the reason for the telephone call.

In a particular embodiment, the method includes prompting the caller for an order identifier. The order identifier can be a telephone number, an account number, or an order number. In another particular embodiment, the method includes receiving the order identifier. In still another particular embodiment, the order identifier is received via a series of touch tones and the order identifier is associated with a previously order telephone service.

In yet another particular embodiment, the method also includes verifying the order identifier. Additionally, the method includes determining whether an order status associated with the order identifier is available. Moreover, the method includes retrieving the order status from a database and providing the order status to the caller.

In another particular embodiment, the method includes transferring the telephone call to a customer service agent when check order status is not indicated as the reason for the call. Further, the method includes transferring the telephone call to a customer service agent when the order identifier is incorrect. Also, the method includes transferring the telephone call to a customer service agent when the order status is unavailable.

In another embodiment, a call management system is disclosed and includes an automated call router and a check order status module that is coupled to the automated call router. In this embodiment, the automated call router comprises a processor, a memory that is accessible to the processor, and a computer program that is embedded within the memory. The computer program includes instructions to prompt a caller to identify a reason for a call and instructions to transfer the call to the check order status module when check order status is indicated.

In yet another embodiment, a touch-tone enterprise check order status module is disclosed and includes a processor, a memory that is accessible to the processor, and a computer program that is embedded within the memory. In this embodiment, the computer program includes instructions to prompt a caller for an order identifier. The order identifier can be a telephone number, an account number, or an order number. In this embodiment, the computer program also includes instructions to receive the order identifier via a series of touch tones and instructions to locate an order status associated with the order identifier.

Figure 1:
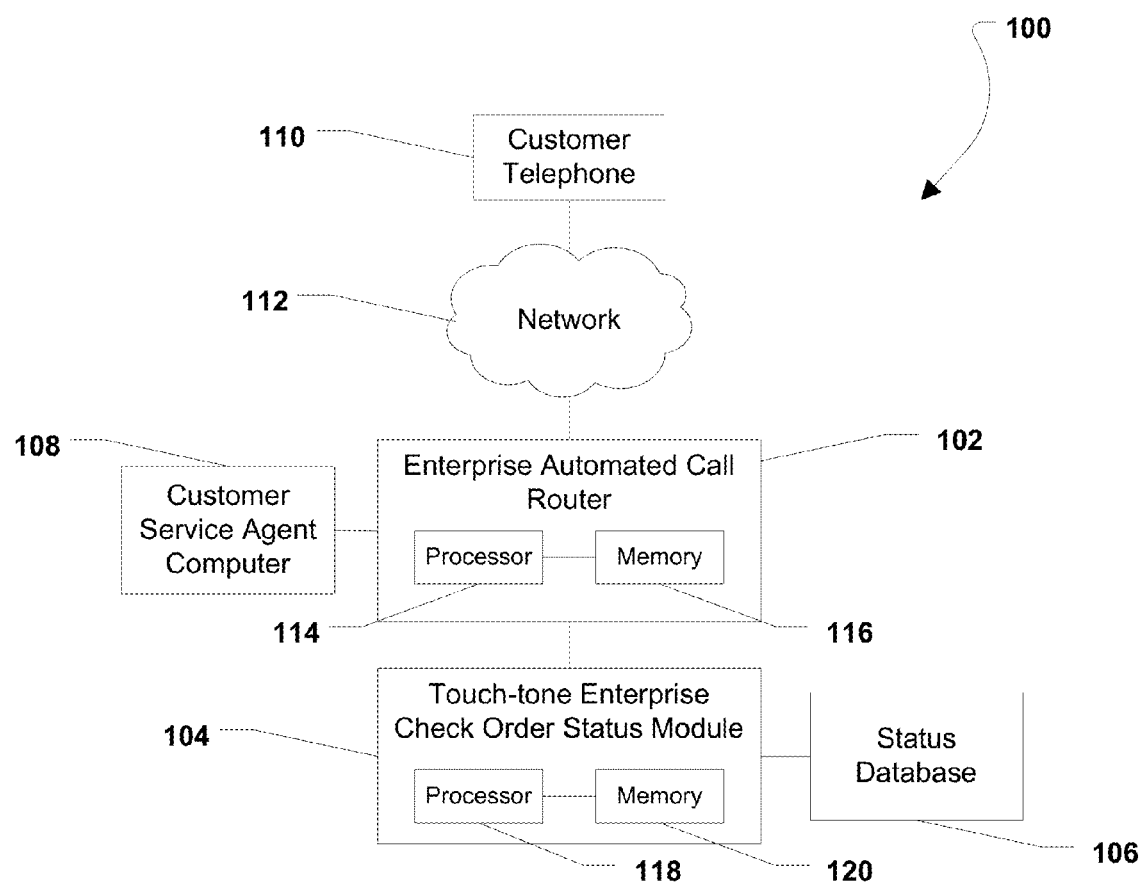
FIG. 1 is a block diagram representative of a call handling system.

Referring to FIG. 1, a system is shown and is generally designated 100. As illustrated in FIG. 1, the system 100 includes a call router 102, e.g., an enterprise automated call router (EACR). Further, the system 100 includes a touch-tone enterprise check order status (TECOS) module 104 that is coupled to the EACR. Additionally, an order status database 106 is coupled to the TECOS module 104.

FIG. 1 further indicates that a customer service agent computer 108 can be coupled to the call router 102. Moreover, a customer telephone 110 can be coupled placed calls to the call router 102 via a telephone network 112. In a particular embodiment, the telephone network 102 can be a public switched telephone network, a cellular telephone network, a mobile telephone network, a voice over Internet protocol (VoIP) telephone network, or any other telephone network that can allow a customer to use the customer telephone 110 to place a call to the call router 102.

In a particular embodiment, the call router 102 includes a processor 114 and a memory 116 that is accessible to the processor 114. Further, in a particular embodiment, the TECOS module 104 includes a processor 118 and a memory 120 that is accessible to the processor 118. The call router 102 can include a computer program that is embedded within the memory 116 and that is executable by the processor 114 in order to determine whether a caller is requesting the order status of a previously placed order. The call router 102 can determine the reason for the call by prompting the caller to speak the reasons for the call.

In a particular embodiment, the order status can include information concerning whether the order is still active and the date, or estimated date, that the order will be fulfilled. In the case that the caller is requesting the order status of an order, the call router 102 can transfer the incoming call to the TECOS module 104. The TECOS module 104 can include a program that is embedded within the memory 120 and that is executable by the processor 118 to determine the order status of a previously placed order. In a particular embodiment, a customer can interact with the program within the TECOS module 104 using the touch-tone capabilities provided by a typical telephone keypad. As such, when the TECOS module 104 receives a call from the call router 102, after the call router 102 has determined that the caller is seeking the order status of an order, the TECOS module 104 automatically knows that the caller would like to check the order status of an order and that a customer service agent has not been requested.

In a particular embodiment, after the call router 102 determines that the reason for the call is to check the order status of an order the call router 102 can set an action object in a message to the TECOS module 104 to "Check-Acquisition Status" and transmit the message to the TECOS module 104 with the call.

Figure 2:
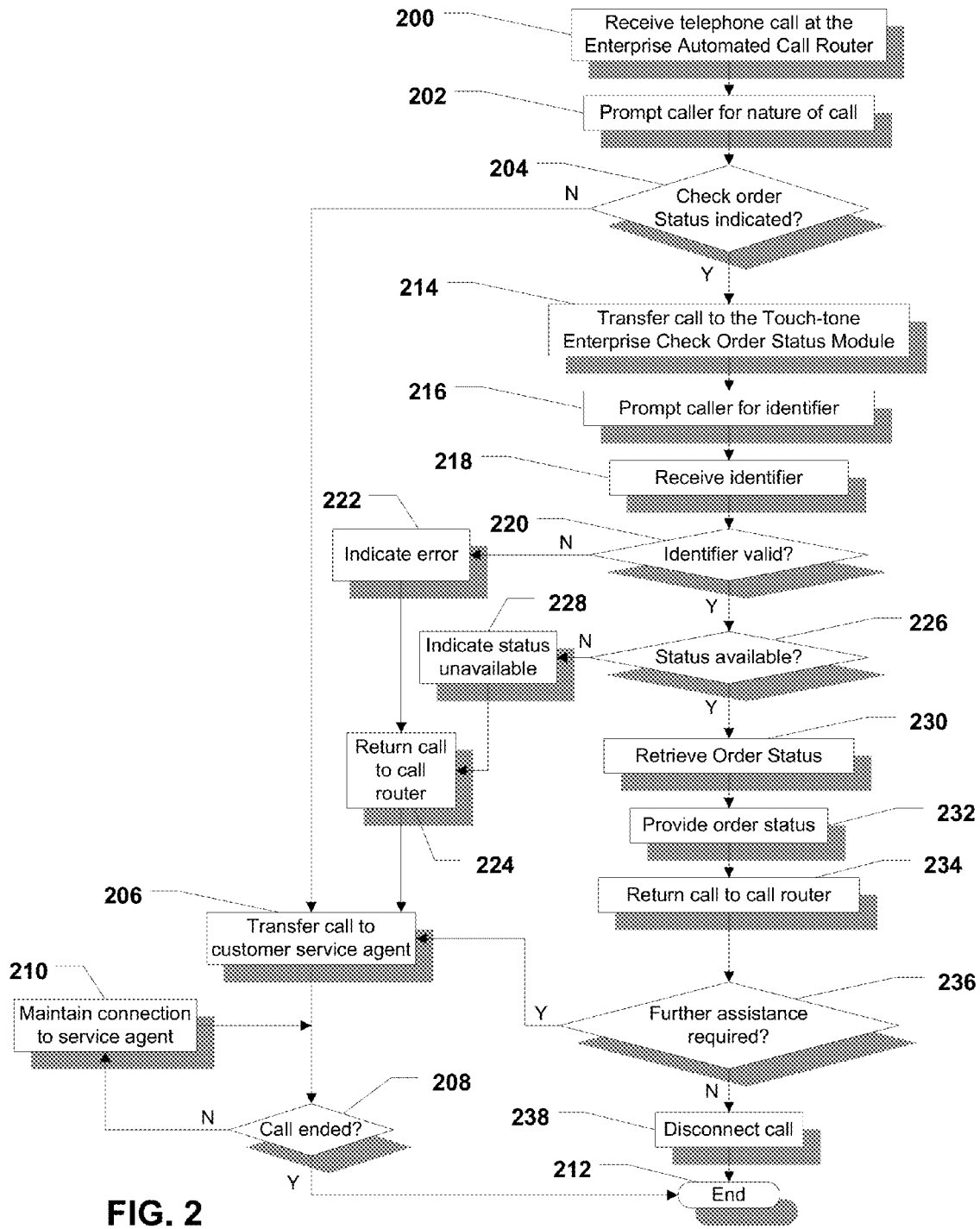
FIG. 2 is a flow chart to illustrate a method of managing telephone calls to a call center.

Referring to FIG. 2, a method of managing telephone calls is shown and commences at block 200. At block 200, a call router, e.g., the call router 102 shown in FIG. 1, receives a telephone call from a caller, such as a customer. At block 202, the call router prompts the caller for the reason for the call, e.g., using an interactive voice response (IVR) module. Moving to decision step 204, the call router 102 determines whether the caller has indicated that the reason for the call is to check the order status of an order. If check order status is not indicated, the method proceeds to block 206 and the call router 102 transfers the call to the next available customer service agent. Thereafter, at decision step 208, the call router determines whether the call has ended. If the call is not ended, the method proceeds to block 210 and the call router maintains the connection to the service agent. On the other hand, if the call is ended the method ends at state 212.

Returning to decision step 204, if a check order status is indicated by the caller, the method moves to block 214 and the call router transfers the call to a touch-tone enterprise check order status (TECOS) module that is coupled to the call router. Moving to block 216, the TECOS module prompts the caller for an order identifier. In a particular embodiment, the order identifier can be a telephone number associated with the caller, an account number associated with an order, or an order number associated with an order. Further, in a particular embodiment, the caller can input the order identifier to the TECOS module using the touch-tone interface, e.g., the keypad, that is provided by a typical telephone.

Proceeding to block 218, the TECOS module receives the order identifier from the caller. Thereafter, at decision step 220, the TECOS module determines whether the order identifier is valid by comparing the order identifier to a list of valid order identifiers within the order status database. If the order identifier is not valid, the method proceeds to block 222 and the TECOS module indicates that an error has occurred, e.g., that the order identifier is invalid or unidentifiable. Next, at block 224, the TECOS module returns the call to the call router. Then, the method proceeds to block 206 and continues as described above.

Returning to decision step 220, when a valid order identifier is received, the method proceeds to decision step 226 and the TECOS module determines whether an order status associated with the order identifier is available. In a particular embodiment, the TECOS module can determine whether the order status is available by querying an order status database using the order identifier. If the order status is not available, the method proceeds to block 228 and the TECOS module indicates to the caller that the order status is unavailable. Thereafter, the method moves to block 224 and continues as described herein.

Returning to decision step 226, if the order status is available, the method proceeds to block 230 and the TECOS module retrieves the order status from the order status database. Next, at block 232, the TECOS module provides the order status to the caller. At block 234, the TECOS module returns the caller to the call router. Thereafter, at decision step 236, the call router queries the caller to whether the caller needs further assistance. If further assistance is required, the method moves to block 206 and continues as described herein. At decision step 236, if further assistance is not required, the method continues to block 238 and the call is disconnected. The method then ends at state 212.

With the configuration of structure described above, the system and method of automated order status retrieval allows a user to call a customer service center and automatically retrieve the order status of a previously placed order, e.g., an order for a product or a service. A user can input an order identifier associated with the previously placed order using the keypad on his or her telephone. A touch-tone enterprise check order status module at a customer service center can receive the order identifier and locate the order status of the order. Once the order status is located, the order status can be transmitted to the user.

In a particular embodiment, the call router and the TECOS module are integrated such that the caller does not realize that the call is being passed between two separate and distinct self-service applications. Due to the integration, the TECOS module knows when a call comes from the call router, a customer is seeking the status of an order and that the customer has not request an agent. After the customer receives the order status, the call can be returned to the call router and the call router can know that the caller was successful in obtaining the order status. In a particular embodiment, the TECOS module is an automated self-service application. In an alternative embodiment, the TECOS module can use speech recognition interface in lieu of a touch-tone interface.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure contemplates a machine readable medium containing instructions, or that which receives and executes instructions associated with a propagated signal, so that a device connected to a network environment can send or receive voice, video or data to communicate over the network.

It will be understood that a device as specified by the present disclosure may also be directed to other electronic devices of similar functionality. For example, a device that provides voice, video or data communication may be implemented as a telephone, a cordless telephone, a mobile phone, a cellular phone, a Personal Digital Assistant (PDA) or other computer-based communication devices. As another example, set-top box functionality may be implemented by a computer and/or a server.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-readable storage device storing instructions that, when executed by a processor, cause the processor to perform operations comprising:
   receiving a first indication that a reason for a call is to obtain an order status; and
   selectively transferring the call to equipment of a customer service agent based on determining whether the order status is locatable, wherein the call is automatically transferred to the equipment of the customer service agent in response to receiving a second indication that the order status is not locatable.

2. The computer-readable storage device of claim 1, wherein the operations further comprise, in response to receiving a first particular indication that the order status is locatable:
   retrieving the order status from an order status database;
   providing the order status to second equipment of a caller during the call;
   prompting the caller to indicate whether further assistance is requested; and
   disconnecting the call in response to receiving a second particular indication that further assistance is not requested.

3. The computer-readable storage device of claim 1, wherein the operations further comprise transferring the call to an automated check order status system in response to receiving the first indication that the reason for the call is to obtain the order status.

4. The computer-readable storage device of claim 1, wherein the operations further comprise receiving an order identifier in response to prompting a caller during the call for the order identifier, wherein the order status is associated with a pending order, and wherein the order identifier identifies the pending order.

5. The computer-readable storage device of claim 4, wherein the operations further comprise:
   receiving the call;
   prompting a caller during the call to provide the reason for the call;
   and
   providing the order status to second equipment of the caller.

6. The computer-readable storage device of claim 4, further comprising determining whether the order identifier is valid in response to receiving the first indication that the reason for the call is to obtain the order status.

7. The computer-readable storage device of claim 4, wherein the order identifier includes a telephone number.

8. The computer-readable storage device of claim 4, wherein the order identifier is received via a series of touch tones.

9. The computer-readable storage device of claim 4, wherein the operations further comprise selectively determining whether the order status is locatable based on the order identifier, wherein whether the order status is locatable is determined in response to a determination that the order identifier is valid and wherein determining whether the order status is locatable includes querying an order status database using the order identifier.

10. The computer-readable storage device of claim 4, wherein the operations further comprise determining that the order identifier is valid by comparing the order identifier to a plurality of valid order identifiers from an order status database and identifying a match of the order identifier to a particular one of the plurality of valid order identifiers.

11. The computer-readable storage device of claim 4, wherein the operations further comprise, in response to a determination that the order identifier is invalid, transferring the call to the equipment of the customer service agent.

12. The computer-readable storage device of claim 4, wherein the order status indicates a date that the pending order is scheduled to be completed.

13. The computer-readable storage device of claim 1, wherein the operations further comprise, in response to receiving aparticular indication that the order status is locatable, retrieving the order status from an order status database.

14. A system comprising:
   a processor; and
   a memory storing instructions that, when executed by the processor, cause the processor to perform operations comprising:
      receiving a first indication that a reason for a call is to obtain an order status; and
      selectively transferring the call to equipment of a customer service agent based on determining whether the order status is locatable,
      wherein the call is automatically transferred to the equipment of the customer service agent in response to receiving asecond indication from a check order status module that the order status is not locatable.

15. The system of claim 14, wherein the operations further comprise, prior to selectively transferring the call to the equipment of the customer service agent, transferring the call to the check order status module in response to receiving the first indication that the reason for the call is to obtain the order status, wherein the order status indicates whether a pending order is active.

16. The system of claim 15, wherein the operations further comprise:

prompting a caller during the call for an order identifier identifying the pending order, wherein the order identifier includes an account number; and prompting the caller to identify the reason for the call.

17. The system of claim 16, wherein the call is received by an automated call router, wherein the automated call router is configured to:

receive the order identifier via a series of touch tones;

validate the order identifier; and determine whether the order status is locatable, wherein the determination is based on the order identifier.

18. A method comprising:

receiving, at a device, a first indication that a reason for a call is to obtain an order status; and selectively transferring, by the device, a call to equipment of a customer service agent based on determining whether the order status is locatable, wherein the call is automatically transferred to the equipment of the customer service agent in response to receiving a second indication that the order status is not locatable.

19. The method of claim 18, further comprising:

prompting, by the device, a caller during the call for an order identifier, wherein the order identifier identifies a pending order, wherein the order status is associated with the pending order;

receiving, at the device, the order identifier;

determining, at the device, whether the order identifier is valid; and in response to determining that the order identifier is valid, determining based on the order identifier whether the order status is locatable by querying an order status database using the order identifier.

20. The method of claim 19, wherein the pending order is associated with a communication service.

* * * * *